April 16, 1946.  A. L. PARKER  2,398,555
COUPLING FOR TUBES
Filed Feb. 18, 1944
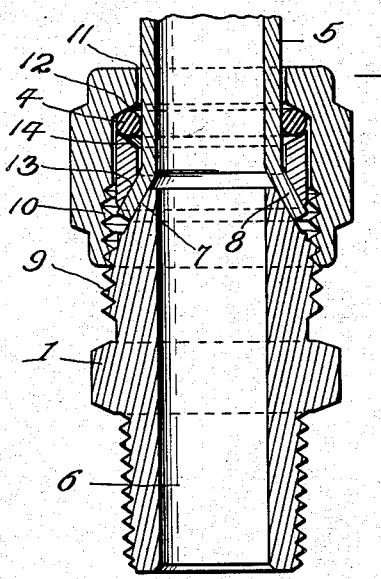
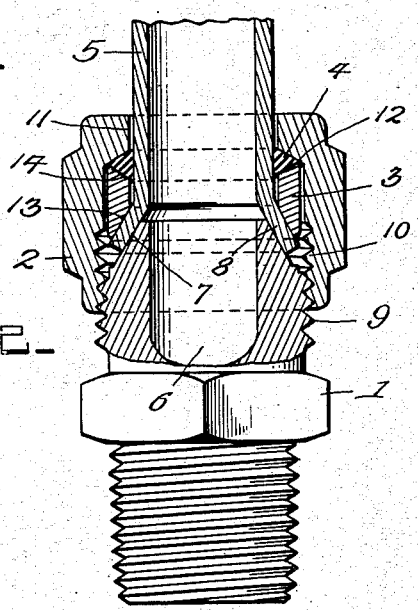
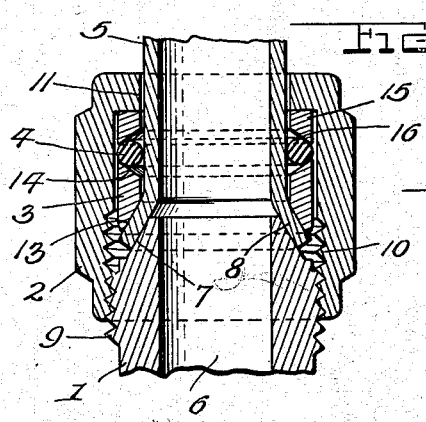 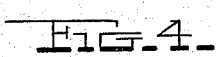 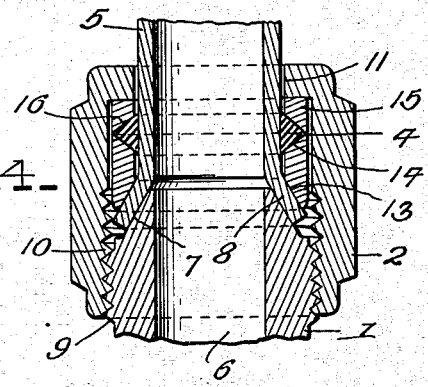
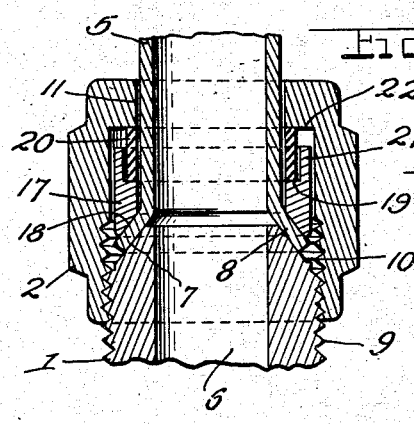 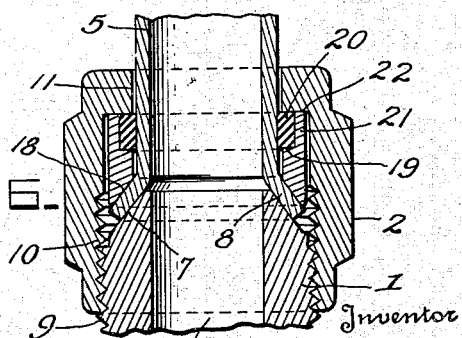
Inventor
Arthur L. Parker.
By Mason, Porter & Diller
Attorneys Patented Apr. 16, 1946

2,398,555

UNITED STATES PATENT OFFICE 2,398,555

COUPLING FOR TUBES

Arthur L. Parker, Cleveland, Ohio, assignor to
The Parker Appliance Company, Cleveland,
Ohio, a corporation of Ohio Application February 18, 1944, Serial No. 522,896

4 Claims. (Cl. 285—86)

The invention relates to new and useful improvements in a coupling for tubes and more particularly to a coupling in which is provided means for gripping the flared end of the tube and for dampening vibrations within the tube.

An object of the invention is to provide a coupling which includes a body member, a nut, a clamping sleeve and a deformable ring, which sleeve and ring are completely housed within the nut and so constructed that the nut operating upon the deformable ring will cause the ring to engage the tube for dampening vibrations therein and wherein means is provided so that the nut after having deformed the ring into engagement with the tube will positively force the sleeve against the flared end of the tube and the tube against the seat on the body member.

A further object of the invention is to provide a coupling of the above type wherein the opposed walls of the sleeve and the nut are inclined away from each other toward the tube so that when pressed upon the ring a radial pressure will be exerted on the ring for deforming the same.

A still further object of the invention is to provide a coupling of the above type with a non-deformable ring disposed between the deformable ring and the nut, and wherein the opposed faces of the sleeve and the non-deformable ring are so constructed as to first impose a radial pressure on the deformable ring for pressing it into engagement with the tube and then through contact force the flared end of the tube against the seat on the body member.

These and other objects will in part be obvious and will in part be hereinafter more particularly described.

In the drawing:

Figure 1 is a view showing a coupling embodying the improvements with the nut attached to the body member and before any clamping pressure has been applied to the deformable ring and the flared end of the tube.

Figure 2 is a view similar to Figure 1, but showing the nut turned onto the body member so as to press the flared end of the tube into contact with the seat on the body member and so as to deform the ring into engagement with the tube for dampening vibrations therein.

Figure 3 is a view similar to Figure 1 but showing a slightly modified form of means operated upon by the nut for deforming the ring into contact with the tube and pressing the flared end of the tube against the seat on the body member.

Figure 4 is a view showing the modified form of construction of Figure 3 with the nut threaded onto the body member and the tube clamped.

Figure 5 is a view similar to Figure 1, but showing a modified form of sleeve and deformable ring. The parts are merely assembled and the nut connected to the body member without exerting any clamping pressure against the tube.

Figure 6 is a view similar to Figure 5, but showing the nut threaded onto the body member, the tube clamped and the deformable ring forced into engagement with the tube for dampening vibrations therein.

The invention has to do with a coupling for tubes. The coupling as shown in Figures 1 and 2 includes a body member 1, a nut 2, a clamping sleeve 3 and a deformable ring 4. The tube which is clamped against a seat on the body member is indicated at 5.

Said body member is provided with means whereby it may be attached to some part to which the tube is to be connected. There is a bore 6 through the body member which bore is surrounded by a seat 7 against which the flared end of the tube 8 is clamped.

The body member is provided with a threaded portion 9 and the nut has a threaded portion 10 which cooperates with the threaded portion 9 on the body member. The nut is provided with a recess in which is disposed the sleeve 3 and the deformable ring 4. The nut has an inwardly extending part 11 which is provided on its inner face with a shoulder 12. This shoulder 12 is adapted to contact with the deformable member 4. The shoulder is inclined so that when pressed against the deformable member it will exert a pressure lengthwise of the tube and also radially of the tube.

The ring 4 may be of any desired cross-sectional shape, but is preferably circular in cross-section as shown in Figure 1. The ring is so dimensioned that it may be readily slipped onto the tube with the nut before the end of the tube is flared.

The clamping sleeve 3 is provided with a tapered surface 13 which conforms as to angularity in a general way with the flare of the outer face of the tube. The sleeve is made of metal and is so dimensioned that it may be readily slipped onto the tube before the end of the tube is flared. The outer end of the sleeve 3 is tapered as indicated at 14. The inclination of this tapered face is such that when the deformable gasket is pressed against the same by the nut it will exert a pressure on the gasket which is longitudinal of the tube and also radial of the tube. When the nut is turned onto the body member for clamping the flared end of the tube against the seat on the body member as shown in Figure 2, this deformable ring is contacted with by the inclined face 12 on the nut and the inclined face 14 on the sleeve, and the ring will be deformed into the shape shown in Figure 2. This deforming of the ring presses it firmly against the tube so that the ring bearing on the tube will dampen vibrations therein.

Another purpose of the inclined faces on the nut and the sleeve is to provide a contact between the nut and sleeve after the ring is deformed as shown in Figure 2 so that the nut operating directly on the sleeve will positively clamp the flared end of the tube against the seat 7 on the body member.

In the modified form shown in Figures 3 and 4, many of the features are similar to those described above and have been given like numerals for reference. The body portion 1 has a seat 7 against which the flared end 8 of the tube 5 is clamped. The nut 2 has a threaded engagement with the body member. The sleeve 3 has an inner tapered end conforming to the outer face of the flared end of the tube. The outer end of this sleeve is likewise tapered or inclined as indicated at 14. The deformable ring 4 is of round cross-section and dimensioned so that it may be readily slipped onto the tube. Located in the nut 2 is a non-deformable ring 15. This ring has a tapered face 16 which contacts with the deformable member 4. The inwardly projecting portion 11 has a right-angled shoulder bearing on a similar shoulder on the non-deformable ring 15. The inclined or tapered faces 14 and 16 contact with the deformable ring and will press the same against the tube as shown in Figure 4. These inclined faces are so shaped and the ring so dimensioned that when it is clamped against the tube for dampening vibrations therein, then the deformable ring 15 will make contact with the sleeve 3 and positively force the flared end of the tube into engagement with the seat 7 on the body member.

The purpose of this non-deformable ring 15 is to provide members which contact with the deformable ring which do not turn during the closing of the coupling. The nut 2 will turn on the ring 15 and force it endwise of the tube.

The modified form shown in Figures 5 and 6 contains some parts which are similar to those shown in the coupling illustrated in Figures 1 and 2 and like numerals have been applied thereto. The body member 1 has a seat 7 against which the flared end 8 of the tube 5 is clamped. The nut 2 has a threaded engagement with the body member. Within the nut is a sleeve 17. This sleeve has a tapered face 18 which conforms as to angle in a general way to the angle of the outer face of the flared end of the tube. The sleeve is provided with a right-angle face 19 adapted to engage a deformable ring 20. The sleeve has an extension 21 which overlies the deformable ring 20 when the parts are first assembled. The sleeve 17 and the deformable ring 20 are dimensioned so that they may be readily slipped onto the tube with the nut before the end of the tube is flared. When the parts are first assembled the right-angled shoulder 22 of the nut engages the deformable ring 20 which, as shown, is rectangular in cross-section. It will compress the deformable ring into the space between the extension 21 and the tube and this will cause the ring to expand radially and grip the tube so as to dampen vibrations therein.

After the deformable member 20 has been expanded into contact with the tube, then the end of the extension 21 on the sleeve 17 will contact with the right-angled shoulder 22 on the nut and further turning of the nut will operate through the sleeve to positively force the flared end of the tube into engagement with the seat 7 on the body member.

From the above it will be noted that a coupling has been provided for securing the flared end of a tube to a seat on a body member which coupling includes parts for engaging the flared end of the tube for positively holding the same in clamped engagement with the seat and which also includes parts which are deformed into engagement with the wall of the tube for dampening vibrations therein.

It is obvious that minor changes in the details of construction and the arrangement of parts may be made without departing from the spirit of the invention as set forth in the appended claims.

I claim:

1. A coupling for tubes having flared ends, said coupling comprising a body member having a seat adapted to engage within the flared end of a tube, a nut having threaded engagement with the body member, a sleeve disposed within the nut and adapted to engage the flared end of the tube, and a deformable ring disposed within the nut and surrounding said tube and engaging said sleeve, said sleeve having an extension overlying the deformable ring which extension is dimensioned so that the nut pressing against the deformable ring will deform the same radially into contact with the tube for dampening vibrations therein, after which said nut engages the extension for positively moving the sleeve into engagement with the flared end of the tube for clamping the same against the seat.

2. A coupling for tubes having flared ends, said coupling comprising a body member having a seat adapted to engage within the flared end of a tube, a nut having threaded engagement with said body member, a sleeve disposed within the nut and adapted to engage the flared end of the tube, and a deformable ring disposed within the nut and surrounding said tube and engaging said sleeve, said nut having an annular surface therein and movable longitudinally therewith and said annular surface and said sleeve being so shaped and dimensioned as to be effective upon threading of the nut home on said body member to first deform said ring between them and press the same against the tube for dampening vibrations therein and then have said annular surface engage the sleeve and force it against the flared end of the tube for positively pressing the flared end of the tube against the seat on said body member.

3. A coupling for tubes having flared ends, said coupling comprising a body member having a seat adapted to engage within the flared end of a tube, a nut having threaded engagement with said body member, a sleeve disposed within the nut and adapted to engage the flared end of the tube, and a deformable ring disposed within the nut and surrounding said tube and engaging said sleeve, the opposed faces of the nut and the sleeve being tapered outwardly toward each other and so cooperatively arranged as to be effective upon threading of the nut home on said body member to first exert radial pressure on the deformable ring for forcing it into contact with the tube and then to contact with each other after said ring is clamped against the tube for positively moving the sleeve against the flared end of the tube and clamping the tube flare against the seat.

4. A coupling for tubes having flared ends, said coupling comprising a body member having a seat adapted to engage within the flared end of the tube, a nut having threaded engagement with said body member, a sleeve disposed within the nut and adapted to engage the flared end of the tube, a non-deformable ring disposed within the nut and adapted to contact with a shoulder at the outer end of the nut, and a deformable ring disposed between the sleeve and the non-deformable ring, the opposed faces of the non-deformable ring and the sleeve being tapered outwardly toward each other and so cooperatively arranged as to be effective upon threading of the nut home on said body member to first exert radial pressure on the deformable ring for forcing it into contact with the tube and then to contact with each other after said ring is clamped against the tube for positively moving the sleeve against the flared end of the tube and clamping the tube flare against the seat.

ARTHUR L. PARKER.